(12) United States Patent
Caliendo et al.

(10) Patent No.: US 9,762,044 B1
(45) Date of Patent: Sep. 12, 2017

(54) PIN-BASED NON-METALLIC FITTINGS FOR ATTACHMENT OF FLEXIBLE METALLIC CONDUIT

(71) Applicant: Siemens Industry, Inc., Alpharetta, GA (US)

(72) Inventors: Guy P. Caliendo, Algonquin, IL (US); Robert Markus, Green Oaks, IL (US); Samuel Waldmann, Barrington, IL (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/272,316

(22) Filed: Sep. 21, 2016

(51) Int. Cl.
    *H02G 3/32*     (2006.01)
    *H02G 15/103*   (2006.01)
    *H02G 1/14*     (2006.01)

(52) U.S. Cl.
    CPC ............ *H02G 15/103* (2013.01); *H02G 1/14* (2013.01)

(58) Field of Classification Search
    CPC .. H02G 1/00; H02G 3/18; H02G 3/00; H02G 3/02; H02G 3/04; H02G 3/0406; H02G 3/06; H02G 3/0616; H02G 3/0625; H02G 3/0666; H02G 3/0691; H02G 1/04; H02G 15/103; H01R 13/5816; H01R 13/73; H01R 13/74; H01R 13/745; H01R 13/741; F16L 7/00
    USPC .... 174/40 CC, 68.1, 68.3, 72 R, 72 A, 74 R, 174/88 R, 70 C, 95, 96, 97, 660, 653, 174/654, 655; 248/49, 68.1, 74.2, 56; 285/139.1, 154.1, 149.1
See application file for complete search history.

(56) References Cited

U.S. PATENT DOCUMENTS

| | | | | |
|---|---|---|---|---|
| 5,647,613 A * | 7/1997 | Marik | ................ | H02G 3/0691 174/660 |
| 6,140,582 A * | 10/2000 | Sheehan | ............. | H02G 3/0683 174/663 |
| 6,262,369 B1 * | 7/2001 | Marik | ................ | H02G 3/0691 174/151 |
| 7,442,079 B1 * | 10/2008 | Gretz | ................. | H02G 3/0691 174/661 |
| 8,350,163 B2 * | 1/2013 | Auray | ................ | H02G 3/0691 174/650 |
| 8,466,378 B1 * | 6/2013 | Gretz | ................. | H02G 3/0616 174/552 |
| 8,476,541 B1 * | 7/2013 | Kiely | .................... | H02G 3/081 174/656 |
| 8,803,008 B2 * | 8/2014 | Chavan | ............... | H02G 3/0691 174/655 |
| 8,901,441 B2 * | 12/2014 | Sathyanarayana | ... | H02G 3/0691 174/655 |

OTHER PUBLICATIONS

"Anaconda Sealtite." Aluminum Core Light Weight Liquid-Tight Flexible Metal Conduit (LFMC). p. 1-1.

(Continued)

*Primary Examiner* — Angel R Estrada

(57) ABSTRACT

Systems and methods are provided for attaching flexible conduit to an adapter. A pin is inserted opposite a retention rib molded into an aperture of the adapter. Due to the geometry of the flexible conduit and the location of the pin and the retention rib, once inserted, the pin secures the flexible conduit and prevents the flexible conduit from coming loose.

20 Claims, 6 Drawing Sheets

(56) References Cited

OTHER PUBLICATIONS

"Flexible Metallic Conduit Fittings." Squeeze Type—Malleable Iron. pp. 1-3, Copyright 2015.
"Metal Clad/Armored Cable/Flex. Conduit and NM Cable Connectors." Cable and Flexible Cord Connectors. p. 1-1, Dec. 2007.

* cited by examiner

PIN-BASED NON-METALLIC FITTINGS FOR ATTACHMENT OF FLEXIBLE METALLIC CONDUIT

TECHNICAL FIELD

Embodiments relate generally to fittings for flexible conduit.

BACKGROUND

Flexible conduit may be made by coiling a self-interlocking ribbed strip of material. The interlocking ribbed structure forms a tube that may bend or flex in multiple directions. The ability to bend allows for flexible conduit to be used in multiple applications where a rigid conduit may not be practical. Unlike rigid conduits, the flexible conduit may change its shape to match each installation or change as repairs are made. Wires are pulled through the tube and are thereby protected by the conduit from damage, both internal and external.

Flexible conduit may be attached to one or more terminals or junction boxes. The fitting between the flexible conduit and the terminal needs to be secure enough to withstand a steady pull so that the flexible conduit is unable to be removed by bending or flexing. For a metal on metal connection, a strap or compression based connection may be used. For a metal conduit and non-metallic terminal (e.g. plastic), a compression based connection may not be useful as the compression required to withstand a steady pull may surpass the structural limits of a non-metallic terminal. A new type of fitting is needed to attach flexible conduit to a terminal.

SUMMARY

A fitting and the use of the fitting with flexible conduit are provided. A rib and retainer contact opposite sides of the flexible conduit in an aperture of the fitting. By placing the rib and retainer in grooves of the flexible conduit, the flexible conduit is held in place in the aperture of the fitting without sufficient compression to surpass the structural limits of the fitting.

In a first aspect, a flexible conduit fitting apparatus is provided. The flexible conduit fitting apparatus comprises a conduit adapter and a removable conduit retainer. The conduit adapter comprises a conduit aperture sized to receive a flexible conduit. The flexible conduit has a minor diameter, a major diameter, and a pitch distance. A conduit retention rib is located in the conduit aperture. The removable conduit retainer is configured to be inserted in the conduit aperture to secure the flexible conduit. The removable conduit retainer is inserted into the conduit aperture opposite the conduit retention rib in the aperture.

In a second aspect, a system is provided for attaching a flexible conduit. The system includes a conduit adapter, a conduit retention rib, and a conduit retention screw. The conduit adapter is configured to receive the flexible conduit through an aperture. The flexible conduit has a minor diameter, a major diameter, and a pitch distance. The conduit retention rib is located on the inside of the aperture of the conduit adapter. The conduit retention screw located across the aperture from the conduit retention rib a distance equal to or greater than the minor diameter and less than the major diameter.

In a third aspect, a method is provided for attaching a flexible conduit. The method comprises inserting the flexible conduit into a conduit adapter. The flexible conduit has a minor diameter, a major diameter and a pitch distance. A conduit retention screw is inserted into the conduit adapter so that the screw is located is located opposite a conduit retention rib integrated with the conduit adapter. The conduit retention screw is also located offset to the conduit retention rib by the pitch distance of the flexible conduit. The conduit retention screw is further located tangentially to the minor diameter of the flexible conduit. The conduit retention screw is driven into the conduit adapter so that the flexible conduit is held in place between the conduit retention screw and the conduit retention rib.

Other systems, methods, and/or features of the present embodiments will become apparent to one with skill in the art upon examination of the following figures and detailed description. It is intended that all such additional systems, methods, features and advantages be included within this description, be within the scope of the invention, and be protected by the accompanying claims. Additional features of the disclosed embodiments are described in, and will be apparent from, the following Detailed Description and the figures.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

In the following description, numerous specific details are set forth in order to provide a more thorough description of the present invention. It will be apparent, however, to one skilled in the art, that the present embodiments may be practiced without these specific details. In other instances, well-known features have not been described in detail so as not to obscure the invention.

An adapter is provided for attaching flexible conduit. The adapter secures the flexible conduit using a conduit retainer and a conduit retention rib. Due to the geometry of the flexible conduit and placement of the conduit retainer, the conduit retention rib and conduit retainer axially constrain the conduit to the adapter without stressing the adapter.

Figure 1:
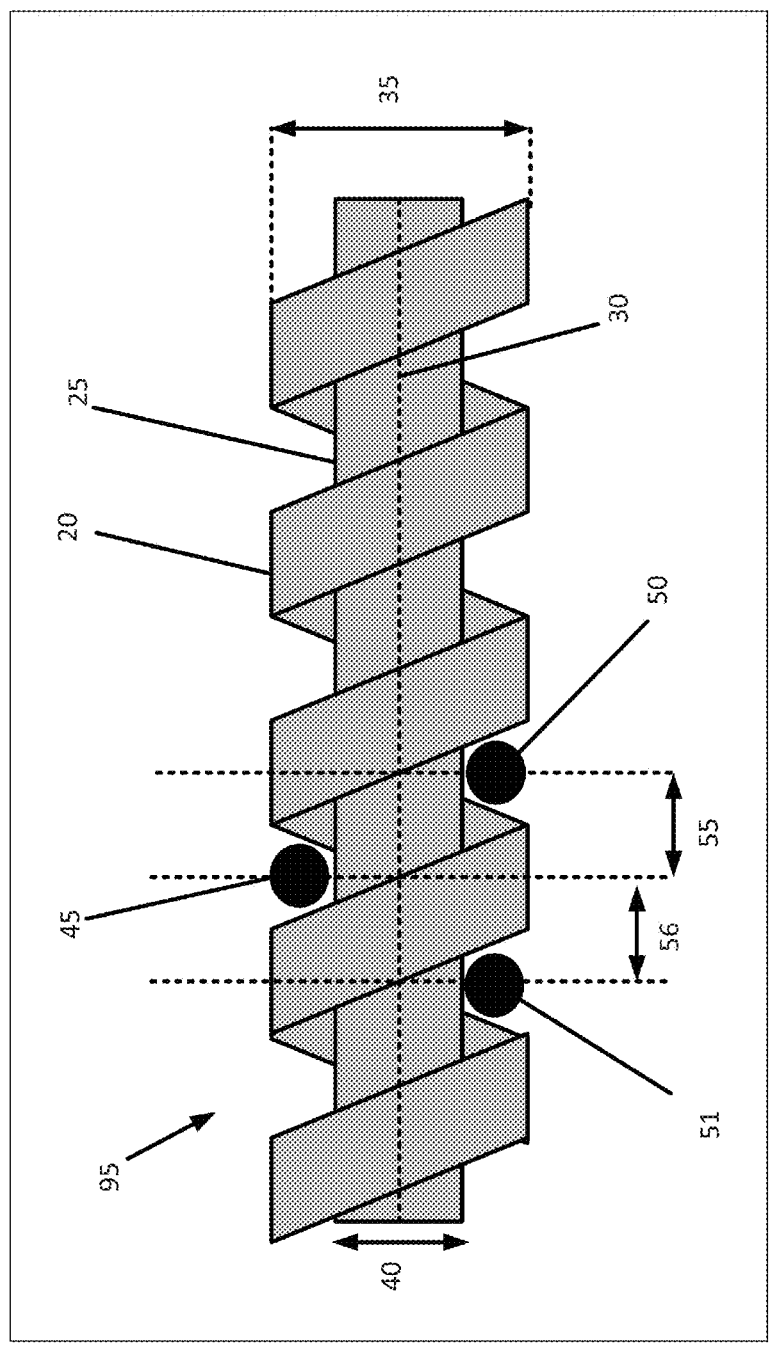
FIG. 1 illustrates an example segment of flexible conduit.

FIG. 1 illustrates an example of flexible conduit 95 depicted here as flexible metallic conduit 95 (FMC). FMC 95 may also be referred to as Greenfield or Flex and may be made of aluminum, steel, galvanized steel, or other material. Other types of flexible conduit, made of non-metallic materials such as plastic or rubber, may be used. FMC 95 may be formed from a self-interlocked strip that when interlocked, provides a ribbed tubular structure with a conduit central axis 30. FMC 95 has both ribs 20 and valleys 25. A valley 25 may refer to the area between the ribs 20 or the closest point to the center of the FMC 95. The ribs 20 or raised portions of the FMC 95 have a different profile than the valleys 25 of the FMC 95. As shown in FIG. 1, a diameter calculated perpendicularly from a rib to another rib is shown as distance 35 (referred to as the major diameter 35). A diameter calculated perpendicularly from a valley to a valley is shown as distance 40 (referred to as the minor diameter 40). The ribs 20 and valleys 25 of the FMC 95 are offset to one another in a spiral or helical pattern such that the ribs 20 are a continuous rib and the valleys 25 are a continuous valley.

The offset between the valleys 25 may be referred to as a pitch (or pitch distance 55). In FIG. 1, the pitch distance 55 is the lateral offset distance along the conduit central axis 30 between the two valleys 45 and 50. The pitch distance 55 may also be measured by using other similar features on opposing sides. A second pitch distance 56 or offset in an opposite lateral direction may be used. In FIG. 1, the second pitch distance 56 is illustrated as the offset from the valley 45 to the valley 51. Depending on the profile of the FMC, e.g. a width of the ribs 20 versus a width of the valleys 25, the pitch distance 55 and second pitch distance 56 may be equal or unequal.

Different types of FMC 95 may have different minor and major diameters depending on the amount of wires or cable the FMC 95 needs to carry. Different types of FMC 95 may have different pitch distances depending on the structure, the flexibility required, or the materials used.

FMC 95 may be used to provide protection for enclosed conductors from an impact or the environment. The enclosed conductors, e.g., wires or cables, may terminate at a junction box or a terminal. A junction box, for example, may serve as an enclosure for electrical connections between incoming wires from the FMC 95 and one or more electrical devices. Junctions or terminals may be formed from metal such as aluminum or steel or a non-metallic material such as plastic. A junction or terminal may have one or more fittings or adapters for attaching a segment of FMC 95. The fittings may be integrated into the junction box or may be a separate adapter and require an additional connection to the junction box. The fitting may be formed from a non-metallic material, such as injection molded plastic. Using injection molded plastic may be less expensive than using a metal component. However, a drawback for using non-metallic materials such as molded plastic is that the non-metallic material may be prone to cracking or failure when exposed to compression stresses. A metallic fitting may be stronger, harder, and more durable than, for example, a plastic counterpart. A metallic fitting may be able to flex or bend and maintain its structural strength while a plastic counterpart cannot. As such, in order to use a non-metallic fitting, precautions may be taken so as not to stress the fitting to failure. A known method of attaching FMC 95 to a junction by using a screw to compress the FMC 95 against the metallic fitting may not be possible for a non-metallic fitting. The stress on the non-metallic fitting required to hold the FMC 95 may deform a non-metallic fitting. A deformed non-metallic fitting may be prone to cracking or failure. Compression may also damage the FMC 95 or the wires enclosed. A screw driven directly on top of FMC 95 may puncture the FMC 95 and either damage the contents or break a seal allowing moisture or chemicals into the conduit.

Figure 2:
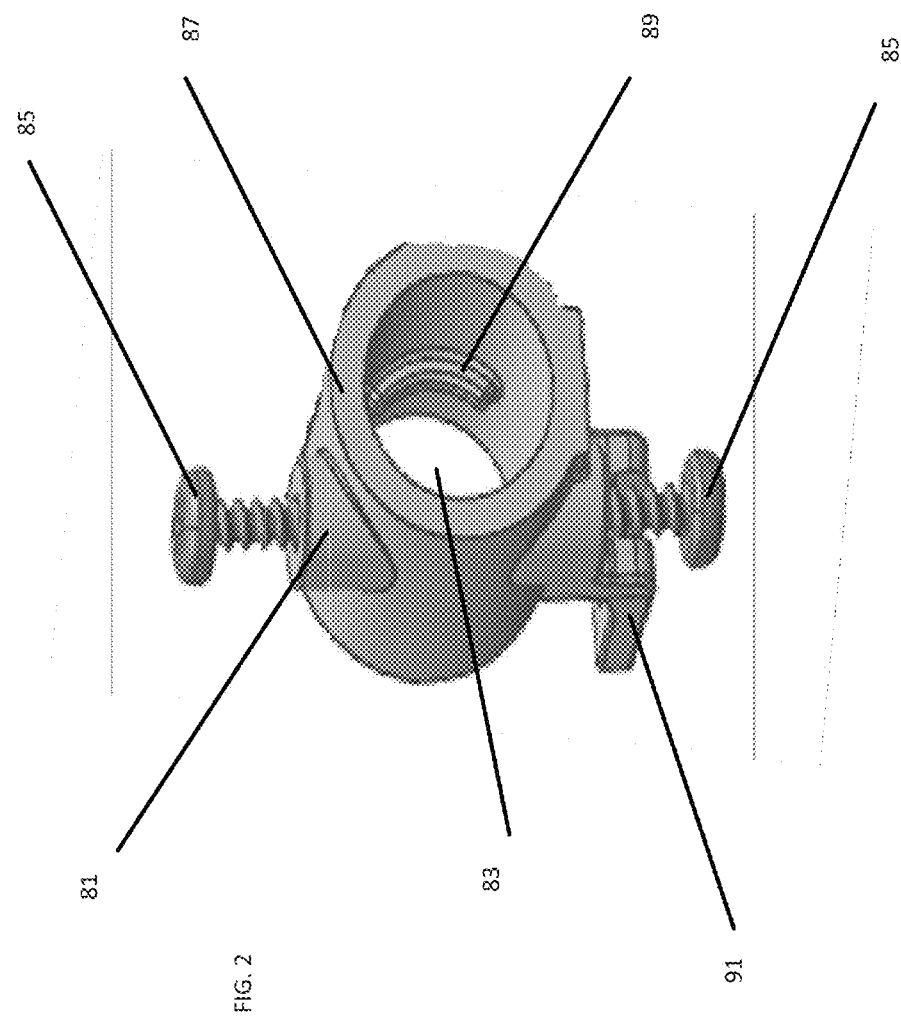
FIG. 2 illustrates an example apparatus of a non-metallic fitting for attachment of flexible metallic conduit.

FIG. 2 depicts an example apparatus for attaching FMC 95 to a fitting. The fitting includes a conduit adapter 87, which includes an aperture 83 configured to receive an end of a segment of FMC 95. Inside the aperture 83, the conduit adapter 87 includes a conduit retention rib 89. The conduit adapter 87 includes one or more guides holes (not shown) configured to receive a conduit pin 85, also referred to as a conduit retainer 85. The conduit retainer 85 may be a separate piece from the fitting. Additional, different, or fewer components may be provided.

The conduit adapter 87 may be formed from a non-metallic material. For example, the conduit adapter 87 may be plastic formed by an injected plastic molding process. Depending on the use, different types of plastic or polymers may be used to alter the rigidity and strength of the resulting plastic part. The conduit adapter 87 may be molded as a single part or as multiple parts that are subsequently fused or glued together. Certain portions of the conduit adapter 87 may be machined after the initial part is formed. For example, the guide hole may be threaded using a boring machine or may be formed as part of the forming of the conduit adapter 87. The conduit adapter 87 may be formed from a metallic material. Alternative material may be used in the conduit adapter 87, such as rubber. Alternative processes may be used to form the conduit adapter 87, such as 3D printing.

The conduit adapter 87 may have multiple structural configurations. For example, the conduit adapter 87 may be rectangular or shaped as a square. Different sized conduit adapters 87 may be used for different sizes of FMC. An entrance of the aperture 83 of the conduit adapter 87 may be flush with a side of a junction box (e.g. the rest of the aperture embedded in the junction box). The conduit adapter 87 may extend outward as shown in FIG. 2. Two or more conduit adapters 87 may be connected or integrated into a junction box. The conduit adapter 87 may include a housing 81 for the guide holes 89. The housing 81 may be formed as part of the conduit adapter 87 or may be a separate part. The housing 81 may hold or contain the top section 88 of the conduit retention clip. As shown in FIG. 2, the housing 81 may extend outward from the conduit adapter 87. The conduit retention clip 85, once inserted, may be protected from the environment and any impacts. The housings 81 may be integrated into the conduit adapter 87 or may be separate parts (for example, a cap that fits around a conduit retainer 85).

The conduit adapter 87 may be integrated as part of a junction box. In such an embodiment, the conduit adapter 87 and junction box may be a single molded piece of plastic. Cost saving for material and incorporation of two separate parts may be achieved by not needing an additional part for conduit adaption, particularly in non-metallic junction boxes. Alternatively, the conduit adapter 87 may be connected to a junction box or terminal using a screw, tab, pin, or any other coupling mechanism. One or more arms or tabs 91 with one or more holes are provided for attachment to the junction box or terminal. Other structures may be used to attach the adapter 87 to the junction box or terminal. The conduit adapter 87 may be embedded into the junction box so that the conduit adapter 87 lies flush with a face of the junction box. The conduit adapter 87 may extend out perpendicularly or on a non-perpendicular angle from the junction box.

The conduit retention rib 89 may be formed as a part of the conduit adapter 87. For example, if the conduit adapter 87 is created by injection molding, the conduit retention rib 89 may be integrated into the design of the mold. Alternatively, the conduit retention rib 89 may be a separate part fitted into the conduit adapter 87 or attached using a coupler, thermal melt, or adhesive. The conduit retention rib 89 may be shaped to match a valley (the area between the raised portions or ribs) of a piece of FMC 95. The depth of the valleys may be defined by half a difference between the minor diameter 40 and the major diameter 35 of the FMC 95. The conduit retention rib 89 may be sized to extend out from the aperture 83 by a length similar to half the distance between the minor 40 and major diameters 35, but greater or lesser extent may be provided. The shape and thickness of the conduit retention rib 89 may be molded to match a profile of a valley of the FMC 95. The shape of the conduit retention rib 89 provides that when the FMC 95 is pressed against the conduit retention rib 89, the raised ribs of the FMC 95 are in contact with or close to the side of the aperture. The rib 89 has any length, such as covering a 30-degree arc of the aperture 83. The conduit retention rib 89 of FIG. 1 is approximately a quarter of the circumference of the aperture 83. In certain embodiments, the conduit retention rib 89 may be larger or smaller depending on the amount of stress expected and type of plastic used. A larger conduit retention rib, may for example, allow for a more secure connection of the FMC 95. A smaller conduit retention rib may break off under high stress conditions but may be sufficient for certain applications. The conduit retention rib 89 may be shaped follow a curve of the FMC 95 (the curved conduit retention rib in FIG. 2). The conduit retention rib 89 may be shaped to be parallel to the conduit retainer 85 (e.g. a horizontal bar as shown in FIG. 3A).

In certain embodiments, the conduit adapter 87 may include two or more conduit retention ribs 89. The retention ribs 89 may be spaced to align with neighboring valleys of the FMC 95. With two retention ribs 89 and the conduit retainer 85, there are three areas of contact with the FMC 95. Likewise, two or more conduit retainers 85 may be used.

Figure 3:
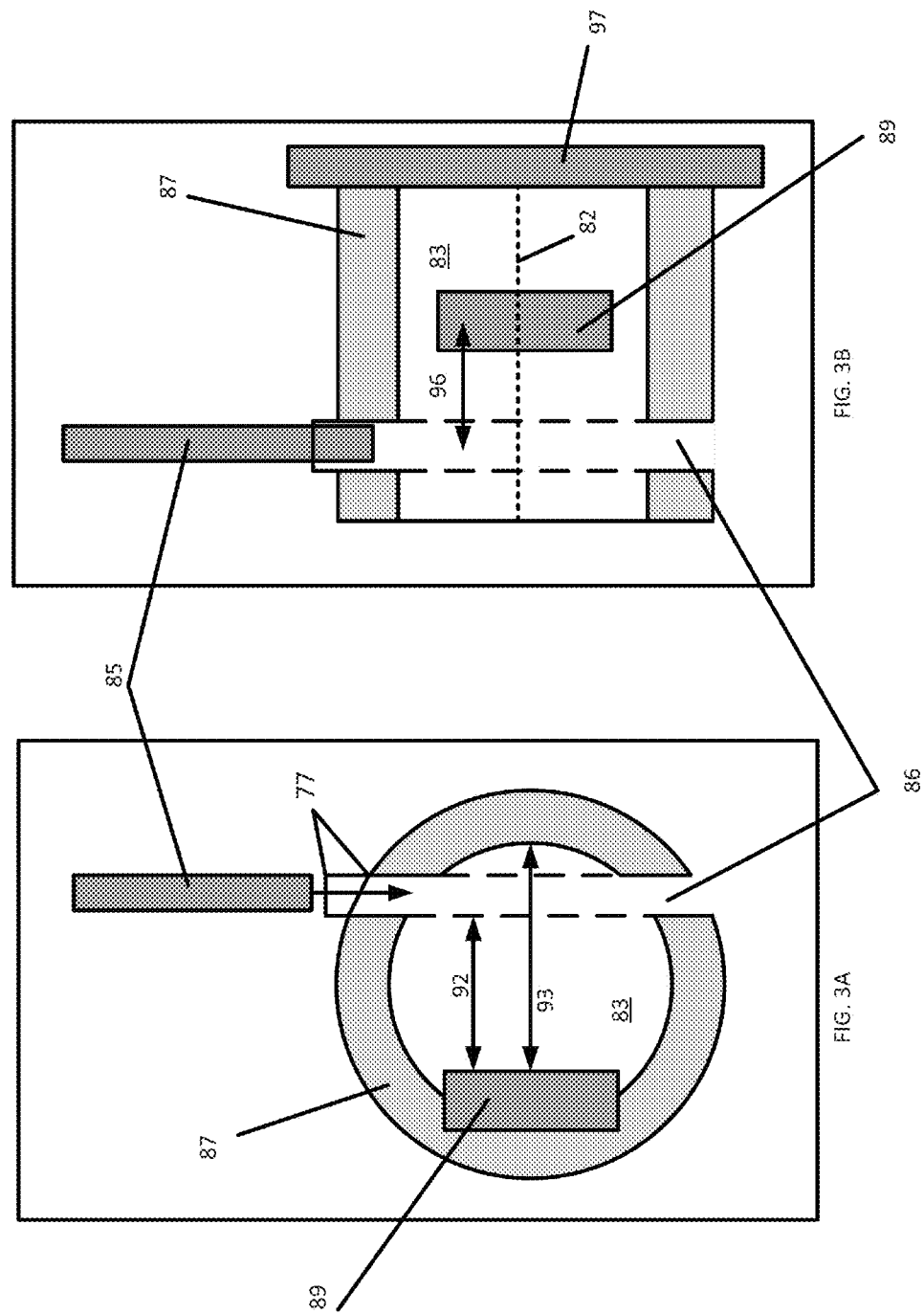
FIG. 3A and FIG. 3B illustrate cross sections of an example non-metallic fitting for attachment of flexible metallic conduit.

FIG. 3A and FIG. 3B depict cross sections of the apparatus of FIG. 2. FIG. 3A depicts a view looking down the aperture 83 from an entrance of the apparatus. FIG. 3A depicts the conduit adapter 87, a conduit cap 77, the aperture 83, the conduit retention rib 89, the conduit retainer 85, and one or more guide holes 86 into which the conduit retainer 85 may be inserted. FIG. 3A further illustrates a distance 92 between the edge of the conduit retention rib 89 and an inserted conduit retainer 85. This distance is measured across a full diameter of the aperture 83 (i.e., through the center of the aperture 83), but is shown offset from the center since the rib 89 has a flat shape rather than curves with the aperture 83. FIG. 3A further illustrates a distance 93 between the edge of the conduit retention rib 89 and an opposite side of the aperture. This distance is also measured across a full diameter of the aperture (i.e., through the center of the aperture 83). The conduit retention rib 89 is located on the side of the conduit adapter 87 extending into the aperture 83.

FIG. 3B depicts a cut away view from a side of the apparatus. FIG. 3B includes the conduit adapter 87, the aperture 83, the conduit retention rib 89, the conduit retainer 85, and a portion of a junction box 97. The adapter 87 and junction box 97 may be a single molded part. One or more electric conductors (e.g. wires or cables) may be inside the FMC 95 and connected to one or more electrical wires in the junction box 97. FIG. 3B further illustrates a lateral distance 96 between a plane formed by a longest central axis of the conduit retainer 85 and perpendicular to a center axis 82 of the aperture 83 and a plane formed by a longest central axis of the conduit retention rib 89 and perpendicular to the center axis 82 of the aperture 83. The lateral distance 96 may be similar to the pitch distance 55. The center of the guide hole 86 may be offset from the retention rib 89 laterally along the center axis of the aperture by the lateral distance 96. The center of the guide hole 86 may be offset from the retention rib 89 laterally along the center axis 82 of the aperture by the pitch distance 55. The location of the conduit retention rib 89 is show approximately half way from a front or back of the conduit adapter 87, but may be at other positions within the aperture 83.

The aperture 83 may be sized to receive the FMC 95. The aperture 83 may be circular or oval shaped. The size of the aperture 83 may be related to the size of the FMC 95. Different diameters of FMC 95 may use different sized apertures (and different sized adapters). The diameter of the aperture 83 is larger than the major diameter 35 of a piece of FMC 95 as described above in FIG. 1. The aperture 83 may be sized so that a segment of the FMC 95 may be inserted into the aperture 83 without coming into contact with or at least passing over the retention rib 89. As shown in FIG. 3A, the distance 93 may be larger than the major diameter 35 of the FMC 95 so that the FMC 95 can pass through the aperture 83 without blocking by the retention rib 89.

At an end of the aperture closer to the junction box 97, there may be a stop or part to limit the lateral movement of the FMC 95. For example, the FMC 95 may only be able to be inserted so far into the aperture until the FMC 95 hits the stop or part.

The one or more guide holes 86 may be configured to accept the conduit retainer 85. In certain embodiments, a single guide hole 86 from one side of the conduit adapter 87 may be used. FIG. 3A and FIG. 3B depict guide holes 86 on two sides of the conduit adapter 87. Using two oppositely placed guide holes 86 may allow for easy access to insert the conduit retainer 85 no matter the orientation of a junction box 97 or FMC 95.

The one or more guide holes 86 may be located opposite from the conduit retention rib 89 as shown in FIG. 3A. The guide hole 86 may be located offset along the central axis 82 of the aperture 83 (as shown in FIG. 3B) from the conduit retention rib 89 by a lateral distance 96 similar to or the same as the pitch distance 55 of the FMC 95. "Similar" in this context allows for ¼ or less difference from the pitch distance 55. Due to the spiral construction of FMC 95, a raised portion or rib on one side of the FMC 95 may not be directly opposite a raised portion or rib on the other side of the FMC 95, but rather offset by a pitch distance 55. The winding of the interlocking strips generates the offset ribs. By offsetting the inserted conduit retainer 85 from the retention rib 89, the FMC 95 is captured in the aperture between the conduit retention rib 89 and the inserted conduit retainer 85. The second pitch distance (in the other direction along the central axis 82) may also be used to offset the conduit retention rib 89 and the guide hole 86 depending on which direction retention rib 89 is offset.

The guide hole 86 may be located a distance 92 from the retention rib 89. The distance 92 may be calculated using the dimensions of the FMC 95. In one embodiment, the distance 92 is no less than the minor diameter 40 and no greater than the major diameter 35. In another embodiment, the distance is less than the minor diameter 40, resulting in compression stress being applied. If the distance is any greater, the FMC 95 may be able to slide in and out of the aperture 83.

Figure 4:
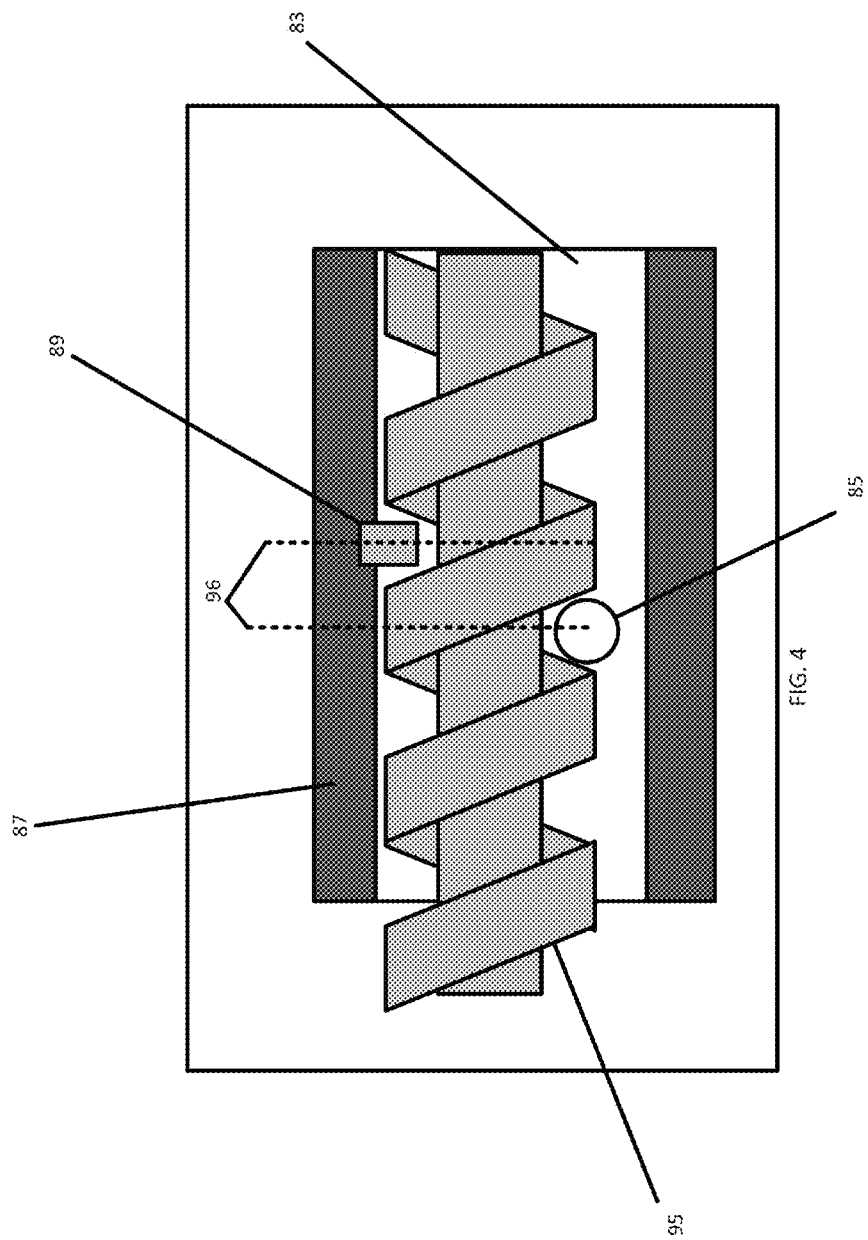
FIG. 4 illustrates a top down cutaway of an example non-metallic fitting for attachment of flexible metallic conduit.

FIG. 4 illustrates a top down cut away view of the FMC 95 captured by the adapter 87. FIG. 4 includes the adapter 87, the aperture 83, the conduit retention rib 89, and the inserted conduit retainer 85. FIG. 4 further illustrates the distance 96 (similar to the pitch distance 55) that the conduit retainer 85 is offset from the conduit retention rib 89. As shown, the conduit retainer 85 and conduit retention rib 89 are offset from one another in order to match the spiral pattern of the FMC 95. The conduit retainer 85 and conduit retention rib 89 align with two of the valleys of the FMC 95 on opposite sides, preventing the FMC 95 from ejecting from the conduit adapter 87.

The guide hole 86 may be threaded to accept a screw. The guide hole 86 may include a locking mechanism to prevent the conduit retainer 85 from coming out. For example, a cap 77 or cotter pin and hole for the cotter pin may be provided that prevents the conduit retainer 85 from falling out. The guide hole 86 may be sized to hold the conduit retainer 85 using friction. For example, the guide hole 86 may be sized slightly smaller than the conduit retainer 85 or in a slightly different shape so that some amount of force is required to both insert and remove the conduit retainer 85.

The pin or conduit retainer 85 may be metallic or non-metallic. The conduit retainer 85 may be threaded or unthreaded. For example, the conduit retainer 85 may be a threaded screw or an unthreaded pin. The conduit retainer 85 is configured to be inserted into the guide hole 86. Once inserted, the conduit retainer 85 is configured to capture the FMC 95 along with the conduit retention rib 89. The conduit retainer 85 is positioned tangentially to a valley of the FMC 95. The FMC 95 is thus unable to move in and out of the aperture 83 as the ribs of the FMC 95 are locked in place. The conduit retainer 85 may be located tangentially to the minor diameter 40 of the FMC 95 so that tightening down the conduit retainer 85 does not create enough force to damage the non-metallic conduit adapter. Due to the geometry of the major diameter 35, minor diameter 40 and pitch distance 55 of the FMC 95 and the adapter's offset retention features (see FIG. 3B), the FMC 95 is captured on its minor diameter 40 in two places on opposite sides of the FMC 95 by the conduit retainer 85 and the retention rib 89. The location of the conduit retainer 85 and conduit retention rib 89 eliminate the possibility of cracking the non-metallic adapter by over tightening.

Figure 5:
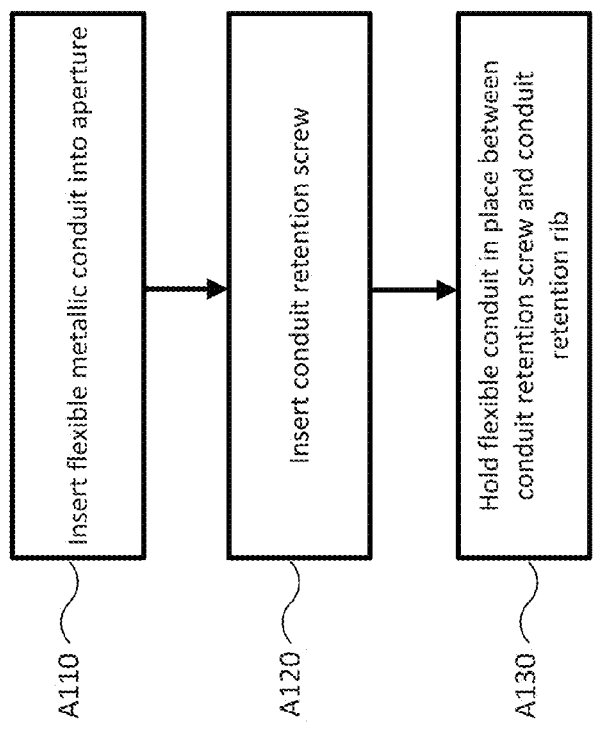
FIG. 5 is a flow diagram of one embodiment of a method for attaching a flexible metallic conduit using a non-metallic fitting.

FIG. 5 depicts a flow chart of one embodiment of a method for attaching a FMC 95 using the apparatus of FIG. 2. Additional, different, or fewer acts may be provided. For example, acts A120 and A130 may be combined as one act. Additional acts such as securing a conduit retention screw may be performed.

At act A110, a segment of FMC 95 is inserted into an aperture of a non-metallic adapter 87. The FMC 95 has a minor diameter 40, a major diameter 35, and a pitch distance 55 as described in FIG. 1. The minor diameter 40 corresponds to a distance that is calculated from a distance of an interior diameter plus the thickness of the FMC 95. The major diameter 35 is the larger diameter that corresponds to the ribs or the outer diameter of the FMC 95. The pitch distance 55 corresponds to a distance that each valley is offset from a valley on the opposing side of the FMC 95.

The non-metallic adapter 87 may include a conduit retention rib 89 located on the interior of the aperture 83. The diameter of the aperture 83 is greater than the distance that the conduit retention rib 89 extends into the aperture 83 plus the major diameter 35 of the FMC 95.

The segment of FMC 95 may be inserted into the aperture 83 until one or more of the ribs of the FMC 95 have passed the conduit retention rib 89. The non-metallic adapter 87 may include a stop to limit how far the FMC 95 may be inserted. For example, the non-metallic adapter 87 may be integrated into a junction box 97 that contains electrical connections. The junction box 97 may protect the wiring or cables and thus have no need for the FMC 95 to extend into the junction box 97. In certain embodiments, the non-metallic adapter 87 is used to support a length of FMC 95. The FMC 95 may be inserted through the aperture 83 until the region that is to be supported is reached.

At act A120, a conduit retention screw is inserted into the non-metallic conduit adapter 87. The screw is inserted into a guide hole 86 and the guide hole 86 is positioned so that the screw, after performing act A130, is located opposite a conduit retention rib 89 integrated with the non-metallic conduit adapter 87, to the conduit retention rib 89 by offset by a lateral distance 96 (similar to the pitch distance 55 of the FMC 95), and tangentially to the minor diameter 40 of the FMC 95.

At act A130, the flexible conduit 95 is held in place between the conduit retention screw and the conduit retention rib. The conduit retention screw is driven into the non-metallic conduit adapter 87 so the FMC 95 is held in place between the conduit retention screw and the conduit retention rib 89. The final location of the conduit retention screw may not compress the conduit adapter 87 or place stress due to compression on either the FMC 95 or the conduit adapter 87. The screw may be driven to enter the guide hole 86 beyond the FMC 95, providing support by the adapter 87 at two ends of the screw. Alternatively, the screw is inserted to provide the holding force without extending through the aperture 83.

The conduit retention screw may be located tangentially to the minor diameter 40 of the FMC 95 so that tightening down the conduit retention screw does not create any force to damage the non-metallic conduit adapter. Due to the geometry of the major diameter 35, minor diameter 40 and pitch distance 55 of the FMC 95 and the adapter's offset retention features, the FMC 95 is captured on its minor diameter 40 in two places by the conduit retention screw and the conduit retention rib 89. The location of the conduit retainer 85 and conduit retention rib 89 eliminate or reduce the possibility of cracking the non-metallic adapter by over tightening.

In order to release the FMC 95, the conduit retention screw may be unscrewed from the non-metallic conduit adapter 87.

Figure 6:
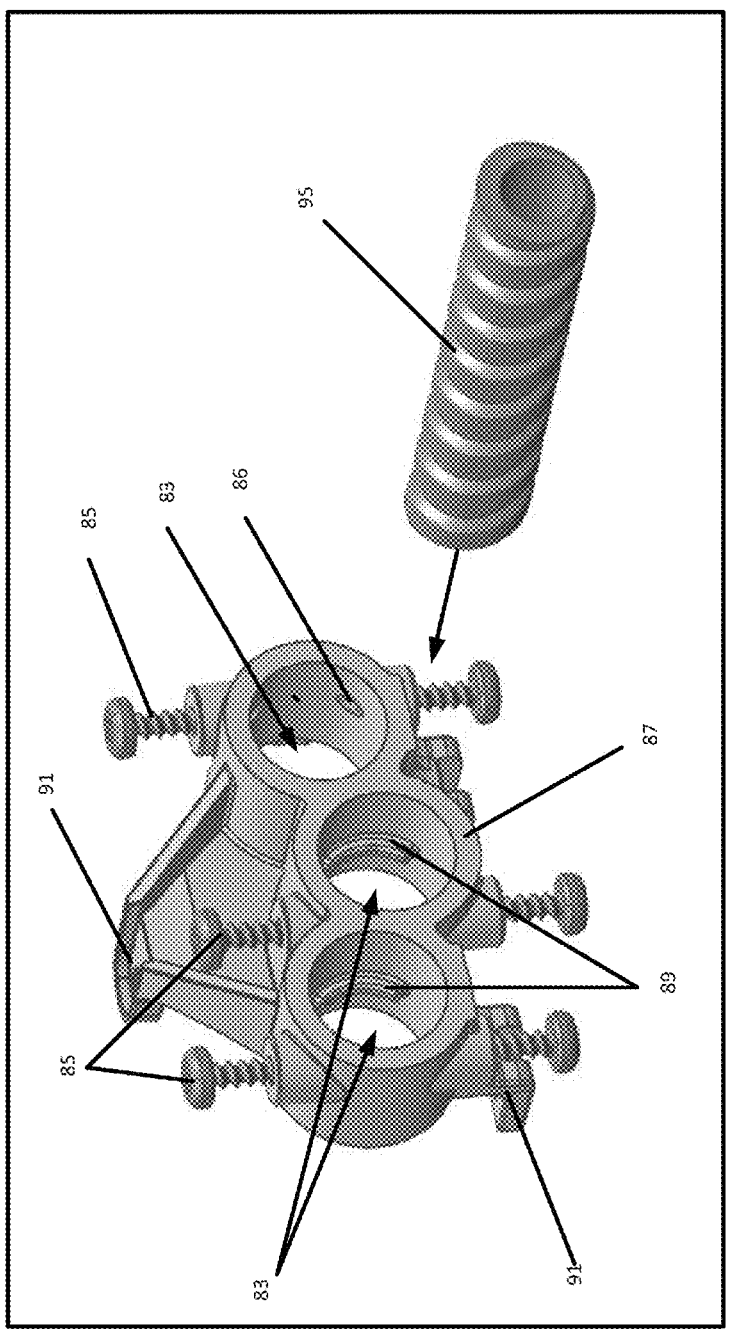
FIG. 6 illustrates an example system for attaching flexible metallic conduit to a non-metallic fitting.

FIG. 6 depicts an example of a system for attaching multiple segments of FMC 95. The system in FIG. 6 includes a conduit adapter 87 that contains three apertures 83 configured to receive FMC 95. The system includes a conduit retention rib 89 for each of the apertures 83 and six conduit retention screws 85 for securing the FMC 95 in place. The system may include additional components. For example, the conduit adapter 87 may be coupled with a junction box 97 using one or more couplers, such as tabs 91. The conduit adapter 87 may be integrated with the junction box 97 in that the junction box 97 and conduit adapter 87 may be formed as a single part. The system may include a ground connection to ground any electrical wires or devices.

The conduit adapter 87 may include one or more apertures 83. Each aperture 83 may be configured to receive a similarly sized segment of FMC 95. Each aperture 83 may be configured to receive different sizes of FMC 95. Each segment of FMC 95 may have a minor diameter 40, a major diameter 35, and a pitch distance 55 that are defined by the relationship of the ribs and valley of the FMC 95. The apertures 83 are sized the same or differently, such as to hold different sized FMC 95.

A conduit retention rib 89 is located on the inside of each of the one or more apertures 83 of the conduit adapter 87. The conduit retention rib 89 may be integrated with the conduit adapter 87. For example, the conduit adapter 87 and conduit retention rib 89 may be a single piece of molded plastic.

The conduit retention screw 85 is located across the aperture 83 from the conduit retention rib 89. When inserted, an edge of the conduit retention screw 85 is located perpendicularly from the conduit retention rib 89 a distance no less than the minor diameter 40 and no greater than the major diameter 35 of the FMC 95. When inserted, the conduit retention screw may be offset from the conduit retention rib 89 by a lateral distance 96 similar to the pitch distance 55 of the FMC 95. FIG. 6 include six conduit retention screws 85, two conduit retention screws 85 for each aperture 83. Only one or the two conduit retention screws 85 may be inserted through the aperture 83. Alternatively, each conduit retention screw 85 may be inserted until the conduit retention screws 85 meet in the aperture 83. With conduit retention screws 85 on opposing sides, if one is unable to be reached due to an installation or repair issue, the other may be able to be accessed.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A flexible conduit fitting apparatus comprising:
    a removable conduit retainer; and
    a conduit adapter comprising:
        a conduit aperture sized to receive a flexible conduit, the flexible conduit having a minor diameter, a major diameter, a valley, and a pitch distance;
        a conduit retention rib located in the conduit aperture; and
        a guide hole formed in the conduit adapter, the guide hole positioned offset from center at a distance of at least half of the minor diameter,
    wherein the removable conduit retainer is configured to be inserted in the guide hole to engage tangentially to the minor diameter of the flexible conduit in order to secure the flexible conduit, wherein the removable conduit retainer is inserted opposite the conduit retention rib in the conduit aperture.

2. The flexible conduit fitting apparatus of claim 1, wherein the removable conduit retainer is configured to be inserted offset from the conduit retention rib along an axis of the conduit aperture, the offset amount matching the pitch distance of the flexible conduit.

3. The flexible conduit fitting apparatus of claim 1, wherein a center of the removable conduit retainer, when inserted into the aperture, is at a distance less than the major diameter and greater than a difference between the minor diameter and one half a width of the removable conduit retainer from the conduit retention rib.

4. The flexible conduit fitting apparatus of claim 1, wherein the removable conduit retainer is inserted in the conduit aperture without causing a deformation of the conduit adapter.

5. The flexible conduit fitting apparatus of claim 1, wherein the flexible conduit is flexible metallic conduit and the conduit adapter is formed from a non-metallic material.

6. The flexible conduit fitting apparatus of claim 5, wherein the non-metallic material is injection molded plastic.

7. The flexible conduit fitting apparatus of claim 1, further comprising:
    a junction box configured to connect wires of one or more electrical devices to one or more wires contained in the flexible conduit.

8. The flexible conduit fitting apparatus of claim 7, wherein the junction box and the conduit adapter are a single molded plastic part.

9. The flexible conduit fitting apparatus of claim 1, wherein the conduit adapter includes a guide hole for the removable conduit retainer, and wherein the removable conduit retainer is insertable into the guide hole from either one of two opposing directions into the conduit aperture.

10. A system comprising:
    a conduit adapter configured to receive a flexible conduit having a minor diameter, a major diameter, and a pitch distance, into an aperture;
    a conduit retention rib located on an inside of the aperture of the conduit adapter;
    a guide hole formed in the conduit aperture, the guide hole positioned offset from center; and
    a conduit retention screw positionable to be located across the aperture from the conduit retention rib by a distance equal to or greater than the minor diameter and less than the major diameter.

11. The system of claim 10, wherein the conduit retention screw is offset along an axis of the aperture from the conduit retention rib by the pitch distance.

12. The system of claim 10, wherein the flexible conduit is flexible metallic conduit and the conduit adapter is formed from a non-metallic material.

13. The system of claim 12, wherein the non-metallic material is injection molded plastic.

14. The system of claim 10, further comprising:
    a junction box configured to connect wires of one or more electrical devices to one or more electrical conductors contained in the flexible conduit.

15. The system of claim 14, wherein the junction box and the conduit adapter are a single molded plastic part.

16. The system of claim 10, further comprising:
    a conduit retention screw cap configured to limit movement of the conduit retention screw.

17. A method for attaching a flexible conduit to a conduit adapter, the method comprising:
    inserting the flexible conduit having a minor diameter, a major diameter and a pitch distance into the conduit adapter;
    inserting a conduit retention screw into the conduit adapter so that the conduit retention screw is located opposite a conduit retention rib integrated with the conduit adapter, the conduit retention screw located offset to the conduit retention rib along an axis of the flexible conduit by the pitch distance of the flexible conduit, the conduit retention screw located tangentially to the minor diameter of the flexible conduit; and
    holding the flexible conduit in place between the conduit retention screw and the conduit retention rib.

18. The method of claim 17, wherein the conduit retention screw is driven into the conduit adapter without causing a deformation of the conduit adapter.

19. The method of claim 17, further comprising:
    forming the conduit retention rib and the conduit adapter with a single piece of injection molded plastic.

20. The method of claim 17, further comprising:
    connecting wires of one or more electrical devices in a junction box to one or more electrical conductors contained in the flexible conduit.

* * * * *